United States Patent [19]
von der Au

[11] 3,835,630
[45] Sept. 17, 1974

[54] ORBITAL PLANETARY MULTIBLADED REVOLVING CUTTER BLADES

[76] Inventor: Roland George Victor von der Au, P.O. Box 185, Halfway House, South Africa

[22] Filed: Nov. 6, 1972

[21] Appl. No.: 304,243

[52] U.S. Cl.................................. 56/295, 56/235
[51] Int. Cl............................................ A01d 55/18
[58] Field of Search.................. 56/295, 235, 16.7; 30/299–307, 347

[56] References Cited
UNITED STATES PATENTS

| | | | |
|---|---|---|---|
| 1,869,394 | 8/1932 | Sikma | 56/235 |
| 2,506,215 | 5/1950 | Hays | 56/16.7 |
| 2,926,480 | 3/1960 | Kimball | 56/235 |
| 3,135,081 | 6/1964 | Booth | 56/16.7 |
| 3,140,575 | 7/1964 | Ott | 56/295 |
| 3,217,812 | 11/1965 | Gallion | 172/16 |
| 3,500,622 | 3/1970 | Bowen | 56/295 |

*Primary Examiner*—Russell R. Kinsey
*Attorney, Agent, or Firm*—Hammond & Littell

[57] ABSTRACT

The orbital planetary multibladed revolving cutter blades are designed to be fitted to mowing and cutting machines, that mow or cut grass or vegetation, to provide an improved cutting action. Independant blade elements rotate past each other in a counter revolving direction.

Because the blades move in close proximity to each other a scissors action takes place, providing a better cutting action.

2 Claims, 2 Drawing Figures

3,835,630

ORBITAL PLANETARY MULTIBLADED REVOLVING CUTTER BLADES

DESCRIPTION OF THE DRAWING

The drawing shows two arrangements of the orbital planetary multibladed revolving cutter blades.

DETAILED DESCRIPTION OF THE INVENTION

Figure 2:
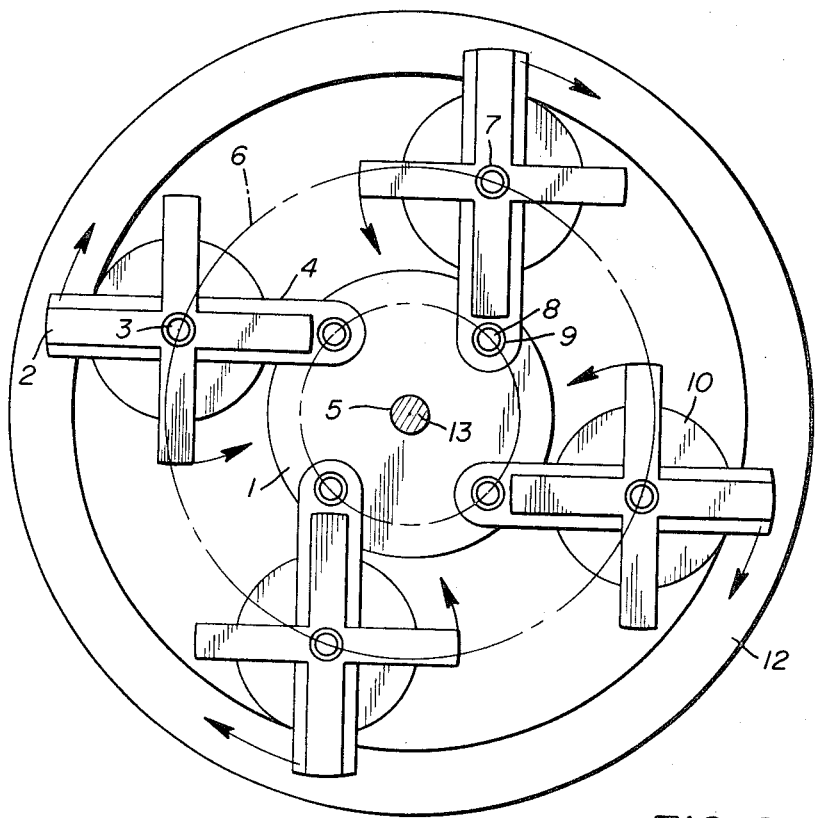
FIG. 2 shows an arrangement for larger mowing machines.

The basic orbital planetary multibladed revolving cutters consist of an assembly of orbital planetary multibladed elements, 2 and blades 4, or blades 11.

The orbital planetary multibladed revolving cutter elements 2, are able to rotate freely in the mounting point 7 or be firmly affixed in the mounting 7 and then be free to rotate about the pivot 3.

The said orbital planetary multibladed revolving blade 2 will rotate about the longitudinal axis of the pivot 3 as the said pivot 3 traverses a circular orbit 6 about the point 5.

Figure 1:
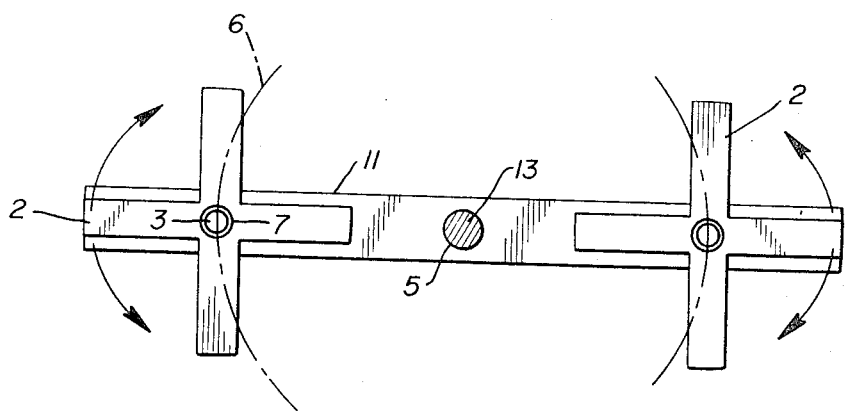
FIG. 1 shows an arrangement for small mowing machines.

The said orbital planetary multibladed revolving blades 2 are positioned by the pivot 3 entering a mounting 7 on the circular orbit 6 where the pivot 3 is so mounted so as to allow the planetary orbital multibladed revolving blades 2 to rotate freely about the longitudinal axis of the pivot 3 in the support at mounting point 7. FIG. 1 of the said orbital planetary multibladed revolving blades 2 and the main blade 11 require that the said orbital planetary multibladed revolving blades 2 which are mounted on pivots 3 be mounted directly into the mounting points 7 in the blade 11.

In FIG. 1 the said orbital planetary multibladed revolving blades 2 will follow the orbital path 6 because the pivots 3 which are the vertical axis of the said revolving blades 2 are attached to the blade 11 at the mounting point 7 which is located on the orbital path 6. A motor means is utilized to revolve the blade 11 in known manner. The motor (not shown) provides a driving torque which is transmitted by shaft 13.

When the blades of the said orbital planetary multibladed revolving blades 2 which will be orbiting about the point 5 are placed in contact with grass or vegetation, then the resistance impact differential force on the blades of the orbital planetary multibladed revolving blades 2 will cause the revolving blades 2 to rotate about its vertical axis pivot 3.

The resistance impact differential force that causes the orbital planetary multibladed revolving blades 2 to rotate is the resistance that the grass or vegetation offers to the passage of the revolving blades 2.

Because the orbital planetary multibladed revolving blades 2 rotate in a counter direction to the direction of rotation of the blade 11 these counter rotating blades moving past each other at a close proximity will provide a scissors cutting action.

In FIG. 2 orbital planetary multibladed revolving blades 2 are driven to rotate about the longitudinal axis of the pivot 3 by mechanical frictional power.

To generate the required mechanical frictional power to rotate the said orbital planetary multibladed revolving blades 2 the said revolving blades 2 are mounted on a blade which together form part of an orbital planetary multibladed revolving blade assembly 4.

The said blade 4 is attached to the disc or axle 1 in such a manner as to allow the blade 4 to move freely about the mounting point 8. The disc 1 functions as an element for interconnecting the blades 4.

Orbital planetary multibladed revolving blades 2 are mounted by pivot 3 in the pivotal mounting point 7 in the blade 4 on the circular orbital path 6.

Each revolving blade 2 is provided in FIG. 2 with drive wheels 10 which are mounted integrally through the pivot shaft 3 to the said revolving blades 2.

When the said disc or axle 1 rotates about its central point 5 the said blades 4 which are attached to the said disc or axle 1 will move away from the central point 5 under centrifugal force. The said drive wheels 10 which are supported on the blade 4 at a radius from the central point 5 will move away from the central point 5 with the blade 4 under centrifugal force. The drive wheels 10 then will move into contact with the circular orbital path element 12 and be forced to rotate as the said drive wheels 10 traverse the orbital path element 12. The said drive wheels 10 are driven by frictional contact between the drive wheels 10 and the orbital path element 12. The rotational energy thus generated is transmitted to the said revolving blades 2 through the pivotal shaft 3 that is the common axis for the said revolving blade 2 and the drive wheel 10. The revolving blades 2 will rotate in a contrary direction to the direction of rotation of the blade 4. A motor means is utilized to rotate disc 1 in known manner. The motor (not shown) provides a driving torque which is transmitted by shaft 13.

Because the orbital planetary multibladed revolving blades 2 rotate in a counter direction to the direction of rotation of the blade 4 these counter rotating blades moving past each other at a close proximity will provide a scissors cutting action.

I claim:

1. An orbital planetary multibladed revolving blade assembly for cutting grass and vegetation comprising at least two blades revolving about a center point; one independent orbital planetary multibladed revolving element rotatably mounted on each of said blades at a radius from said center point and in close proximity to said blades; an element for interconnecting said at least two blades and said element mounted on a center point; means for revolving said element about said center point, such that said orbital planetary multibladed revolving elements execute a circular orbit about said center point; a circular casing disposed above said at least two blades revolving about a center point; and means to rotate each of said independent orbital planetary multibladed revolving elements in a direction opposite the direction of rotation of said at least two blades revolving about a center point comprising a drive wheel rotatably mounted on the opposite side of each of said blades from said independent orbital planetary multibladed revolving elements and rigidly affixed to said independent orbital planetary multibladed revolving elements and in frictional contact with said circular casing.

2. The orbital planetary multibladed revolving blade assembly of claim 1 wherein said element for interconnecting said at least two blades comprises a circular disc revolving about a center point; and wherein said at least two blades revolving about a center point comprises a plurality of blades symmetrically and rotatably mounted on the periphery of said circular disc revolving about said center point.

* * * * *